United States Patent
Ebrahimi Afrouzi et al.

(10) Patent No.: US 10,239,370 B2
(45) Date of Patent: Mar. 26, 2019

(54) WHEEL SUSPENSION SYSTEM

(71) Applicant: AI Incorporated, Toronto (CA)

(72) Inventors: Ali Ebrahimi Afrouzi, San Jose, CA (US); Scott McDonald, Toronto (CA)

(73) Assignee: AI Incorporated (CA)

( * ) Notice: Subject to any disclaimer, the term of this patent is extended or adjusted under 35 U.S.C. 154(b) by 0 days.

(21) Appl. No.: 15/951,096

(22) Filed: Apr. 11, 2018

(65) Prior Publication Data

US 2019/0039428 A1 Feb. 7, 2019

Related U.S. Application Data

(60) Provisional application No. 62/620,352, filed on Jan. 22, 2018, provisional application No. 62/617,589, filed on Jan. 15, 2018, provisional application No. 62/540,189, filed on Aug. 2, 2017.

(51) Int. Cl.
*B60G 3/26* (2006.01)
*B60G 21/05* (2006.01)

(52) U.S. Cl.
CPC ............. *B60G 3/26* (2013.01); *B60G 21/051* (2013.01); *A47L 2201/00* (2013.01); *B60G 2200/13* (2013.01); *B60G 2202/13* (2013.01); *B60G 2204/1244* (2013.01)

(58) Field of Classification Search
CPC .................... B60G 3/26; B60G 21/051; B60G 2204/1244; B60G 2202/13; B60G 2200/13; A47L 2201/00; A47L 2201/04
See application file for complete search history.

(56) References Cited

U.S. PATENT DOCUMENTS

| | | | |
|---|---|---|---|
| 4,537,420 A | 8/1985 | Ito et al. | |
| 5,036,941 A * | 8/1991 | Denzin | B60G 3/00 180/252 |
| 5,697,633 A | 12/1997 | Lee | |
| 5,924,712 A | 7/1999 | Pierce | |
| 6,581,239 B1 * | 6/2003 | Dyson | A47L 5/34 15/340.3 |

(Continued)

OTHER PUBLICATIONS

The URANUS Mobile Robot, Mike Blackwell, Mobile Robot Lab, The Robotics Institute Carnegie Mellon University Pittsburgh, PA. 1S213, Sep. 1990 (attached).

(Continued)

*Primary Examiner* — Paul N Dickson
*Assistant Examiner* — Timothy Wilhelm
(74) *Attorney, Agent, or Firm* — Soody Tronson; STLG Law Firm

(57) ABSTRACT

Robotic devices are presented including: a body; an electronic computing device housed within the body; and at least two wheeled suspension systems coupled with the body, each wheeled suspension system including, a first suspension system including: a frame, a rotating arm pivotally coupled to the frame on a first end and coupled to a wheel on a second end, and an extension spring coupled with the rotating arm on a third end and the frame on a fourth end, where the extension spring is extended when the wheel is retracted, a second suspension system including: a base slidingly coupled with the frame, and a number of vertically positioned extension springs coupled with the frame on a fifth end and the base on a sixth end.

28 Claims, 7 Drawing Sheets

(56) References Cited

U.S. PATENT DOCUMENTS

| | | | | |
|---|---|---|---|---|
| 7,249,640 B2* | 7/2007 | Horchler | ............... | B62D 57/022 180/7.1 |
| 7,418,762 B2* | 9/2008 | Arai | ............... | A47L 5/28 15/319 |
| 7,441,298 B2* | 10/2008 | Svendsen | ............... | A47L 5/30 15/49.1 |
| 7,581,282 B2* | 9/2009 | Woo | ............... | A47L 9/009 15/319 |
| 7,975,790 B2* | 7/2011 | Kim | ............... | B60G 3/01 180/65.51 |
| 8,417,383 B2* | 4/2013 | Ozick | ............... | G05D 1/0231 700/245 |
| 8,515,577 B2* | 8/2013 | Wang | ............... | B25J 9/1689 700/247 |
| 9,033,079 B2* | 5/2015 | Shin | ............... | B25J 5/007 180/65.6 |
| 9,259,129 B2* | 2/2016 | Jang | ............... | A47L 9/2805 |
| 9,317,038 B2* | 4/2016 | Ozick | ............... | A47L 9/009 |
| 9,326,654 B2* | 5/2016 | Doughty | ............... | A47L 9/0477 |
| 9,335,767 B2* | 5/2016 | Jang | ............... | G05D 1/0227 |
| 9,364,129 B2* | 6/2016 | Weis | ............... | A47L 11/32 |
| 9,480,380 B2* | 11/2016 | Yoo | ............... | A47L 11/4011 |
| 9,661,971 B2* | 5/2017 | Riehl | ............... | A47L 9/009 |
| 9,687,132 B2* | 6/2017 | Schlischka | ............... | A47L 11/4061 |
| 9,758,006 B2* | 9/2017 | Jeong | ............... | B60G 17/0195 |
| 9,883,778 B2* | 2/2018 | Vanderstegen-Drake | ............... | A47L 9/009 |
| 9,908,432 B2* | 3/2018 | Park | ............... | B60L 15/20 |
| 9,936,844 B2* | 4/2018 | Nakamura | ............... | A47L 9/009 |
| 2006/0005344 A1* | 1/2006 | Uehigashi | ............... | A47L 9/009 15/319 |
| 2008/0282494 A1* | 11/2008 | Won | ............... | A47L 5/30 15/319 |
| 2010/0243344 A1* | 9/2010 | Wyrobek | ............... | B25J 5/007 180/21 |
| 2013/0054022 A1* | 2/2013 | Jang | ............... | A47L 9/2805 700/245 |
| 2015/0150429 A1* | 6/2015 | Yoo | ............... | A47L 11/4011 173/1 |
| 2016/0259336 A1* | 9/2016 | Lee | ............... | B60G 17/016 |

OTHER PUBLICATIONS

International application No. PCT/USIS/44357 ISR and WO.

* cited by examiner

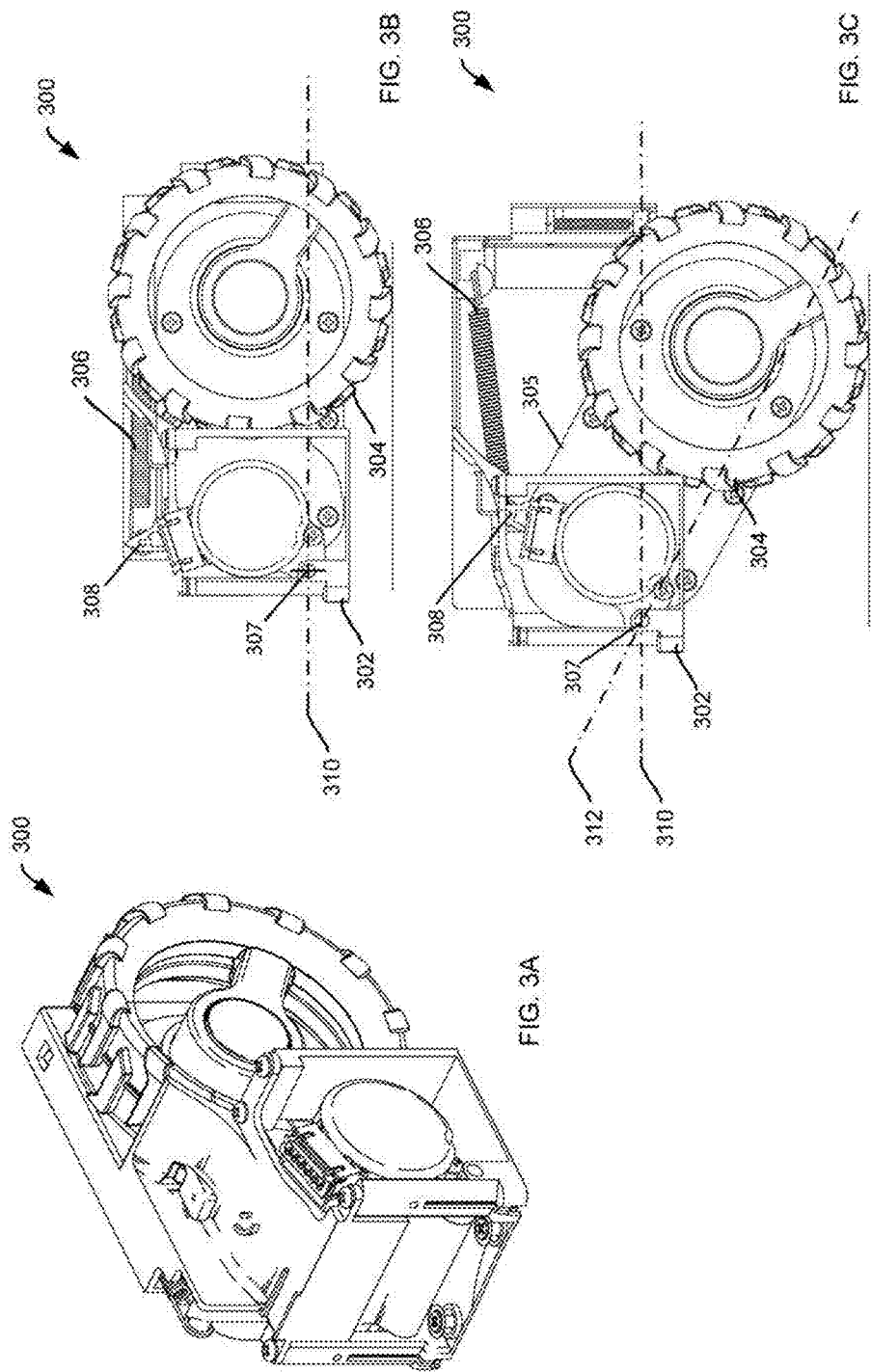

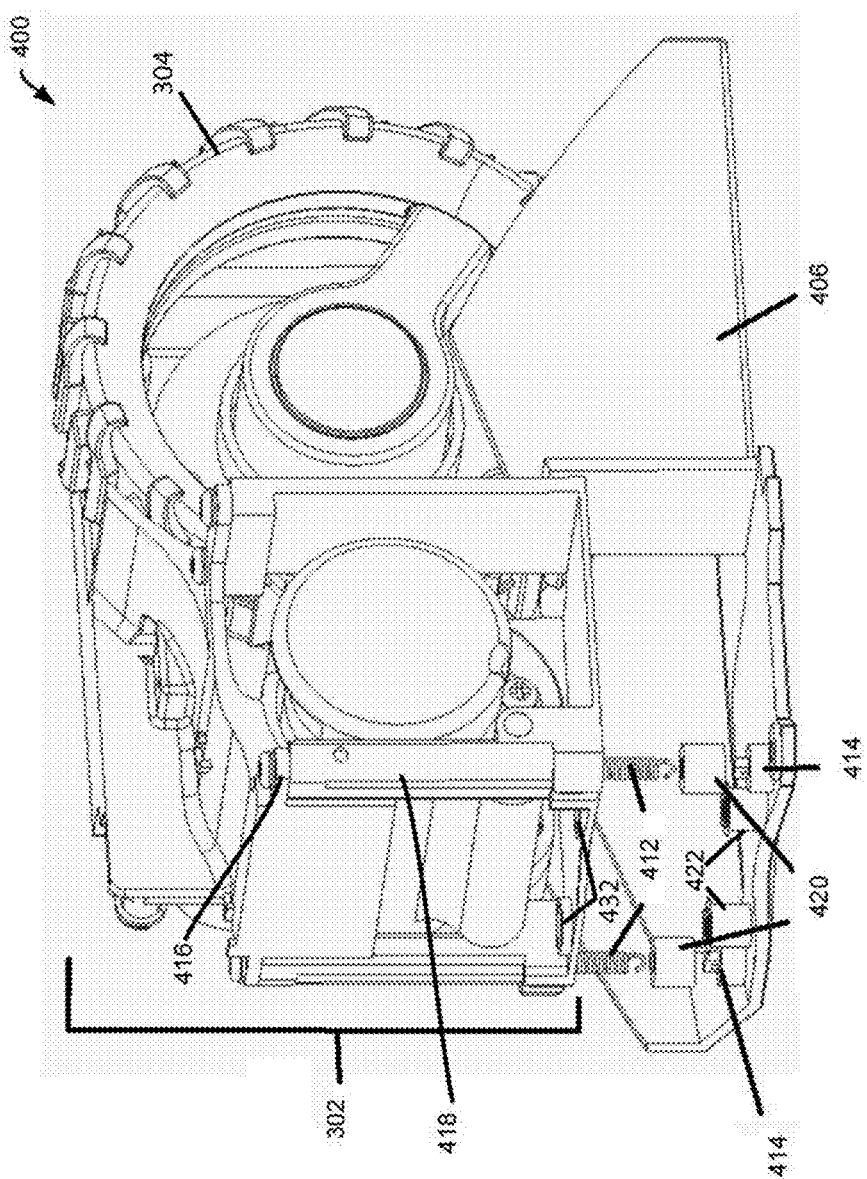

WHEEL SUSPENSION SYSTEM

FIELD OF INVENTION

Present embodiments related to suspension systems for robotic devices. In particular to suspension systems in robotic vacuums.

BACKGROUND

A car requires a dynamic wheel system to achieve control and stability by maintaining contact between the wheels and the ground at all times, particularly when driving over uneven surfaces and obstacles. A robotic vacuum may also benefit from a dynamic wheel system to operate effectively as they drive in a variety of indoor environments comprising combinations of hardwood, carpeted, and tiled floors, along with rugs and doorways that form uneven surfaces and act as obstacles. Objects such as cords may also be encountered. Using a static wheel system, any obstacles or transitions, such as a door threshold, could only be overcome by supplying the wheels with large amounts of torque, which is ineffective. In a worst-case scenario, the robot may stall if its wheels lose contact with the floor.

As such, a double suspension, dynamic wheel system for robotic devices is presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, robotic devices are presented including: a body; an electronic computing device housed within the body; and at least two wheeled suspension systems coupled with the body, each wheeled suspension system including, a first suspension system including: a frame, a rotating arm pivotally coupled to the frame on a first end and coupled to a wheel on a second end, and an extension spring coupled with the rotating arm on a third end and the frame on a fourth end, where the extension spring is extended when the wheel is retracted, a second suspension system including: a base slidingly coupled with the frame, and a number of vertically positioned extension springs coupled with the frame on a fifth end and the base on a sixth end. In some embodiments, the extension spring of the first suspension system applies a force to the rotating arm as the extension spring compresses, causing the rotating arm to rotate outwards beyond the base towards the driving surface. In some embodiments, the rotating arm rotates outwards beyond the base towards the driving surface until the wheel coupled to the rotating arm contacts the driving surface. In some embodiments, the wheel coupled to the rotating arm presses against the driving surface when the rotating arm is forcibly rotated outwards beyond the base towards the driving surface. In some embodiments, the number of extension springs of the second suspension system apply a force to the frame and base, pulling the two components together as the extension springs compress. In some embodiments, extension of the number of extension springs of the second suspension system cause vertical upward movement of the frame, rotating arm, and wheel. In some embodiments, compression of the number of extension springs of the second suspension system cause vertical downward movement of the frame, rotating arm, and wheel. In some embodiments, the frame includes a number of spring housings for retaining the number of extension springs of the second suspension system. In some embodiments, the second suspension system further includes a number of dampers positioned along each axis of each of the number of extension springs. In some embodiments, where the base further includes a number of travel limiting screws that limit linear displacement of the second suspension system by physically limiting the movement of the frame by contact with the screw. In some embodiments, the second suspension system includes a three-point suspension system. In some embodiments, the secondary suspension system includes at least one set of paired magnets, with at least one magnet affixed to the frame and paired to at least one magnet affixed to the base. In some embodiments, paired magnets enable the frame and base to separate when traversing uneven surfaces and pull the frame and base together after separation. In some embodiments, embodiments are presented further including a number of mounting elements that couple the double suspension wheel system to a robotic device. In some embodiments, the first suspension system is a long-travel suspension system. In some embodiments, the first suspension system is pivotally actuated. In some embodiments, the second suspension system is a short-travel suspension system. In some embodiments, the second suspension system is linearly actuated.

In other embodiments, wheeled suspension systems are presented including: a first suspension system including: a frame, a rotating arm pivotally coupled to the frame on a first end and coupled to a wheel on a second end, and an extension spring coupled with the rotating arm on a third end and the frame on a fourth end, where the extension spring is extended when the wheel is retracted, a second suspension system including: a base slidingly coupled with the frame, and a number of vertically positioned extension springs coupled with the frame on a fifth end and the base on a sixth end. In some embodiments, the frame includes a number of spring housings for retaining the number of extension springs of the second suspension system. In some embodiments, the second suspension system further includes a number of dampers positioned along each axis of each of the number of extension springs. In some embodiments, the base further includes a number of travel limiting screws that limit linear displacement of the second suspension system by physically limiting the movement of the frame by contact with the travel limit screw.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

Non-limiting and non-exhaustive features of the present invention are described with reference to the following figures, wherein like reference numerals refer to like parts throughout the various figures.

FIGS. 3A-3C are illustrative representations of a wheel embodying features of the present invention;

FIG. 4 is an illustrative representation of a wheel embodying features of the present invention;

DETAILED DESCRIPTION

Figure 1A:
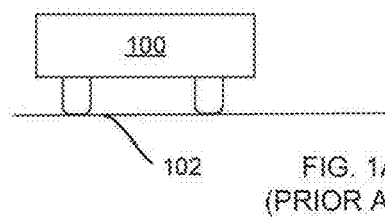
FIGS. 1A-1C are prior art illustrative representations of a rolling device with static wheel system.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In still other instances, specific numeric references such as "first material," may be made. However, the specific numeric reference should not be interpreted as a literal sequential order but rather interpreted that the "first material" is different than a "second material." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Static wheel systems perform poorly as the wheels are susceptible to losing contact with the driving surface when uneven surfaces are encountered. For example, the four fixed wheels of an automobile maintain contact with the road when it is completely flat. However, anytime an uneven driving surface is encountered, due to, for example, a localized bump or pothole in the road, one or more of the wheels may lose contact with the road. This effect results in discomfort for riders and reduces the control and stability of the automobile, hence the importance of suspension systems. In prior art, trailing arm suspension systems have been implemented to ensure wheels maintain contact with the driving surface when discontinuities in the surface or obstacles are traversed. A trailing arm suspension system comprises an arm that is connected to the axle on one end and a pivot point on the chassis or a component fixed to the chassis on the other end. The arm is perpendicular to the axle and the pivot point is forward of the axle, resulting in a trailing arm. The pivoting action allows the wheels to maintain contact with the driving surface when traversing uneven surfaces. A downward force may be applied to the rotating arm by, for example, a spring, causing the axle and hence wheel to be pressed against the driving surface forcefully, ensuring that the wheels maintain contact with the driving surface at all times. Configuration of the trailing arm suspension may vary. The trailing arm suspension allows each wheel to move independently of the opposite wheel and the automobile.

Figure 1B:
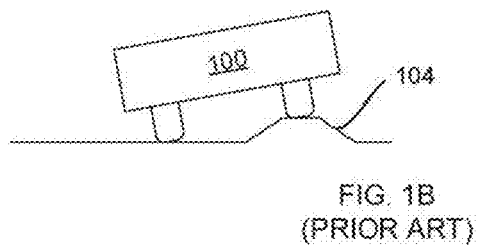
Figure 1C:
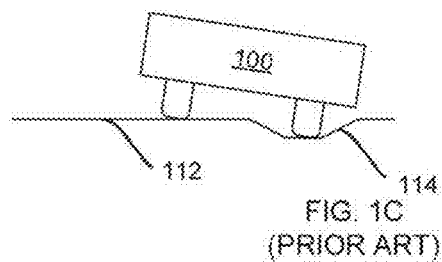

FIGS. 1A-1C are prior art illustrative representations of a rolling device with static wheel system. In particular, FIGS. 1B and 1C illustrate a rolling device traversing a localized bump and a pothole on a rolling surface, respectively. In FIG. 1A, rolling device 100 is illustrated and positioned on levelled surface 102. As rolling device 100 drives, both wheels maintain contact with surface 102 as it is flat. In FIG. 1B rolling device 100 encounters bump 104. As bump 104 is traversed, rolling device 100 with static wheel system is no longer levelled and both wheels lack full contact with the rolling surface. In such instances, directional control may be impacted as well as stability. Further, without suspension, traversing localized discontinuities in the surface or obstacles may result in a bumpy or uncontrollable ride. In FIG. 1C, rolling device 100 encounters pothole 114. As pothole 114 is traversed on surface 112, rolling device 100 with static wheel system is no longer level and both wheel lack full contact with the rolling surface. As above, control, stability and ride quality are impacted.

Figure 2A:
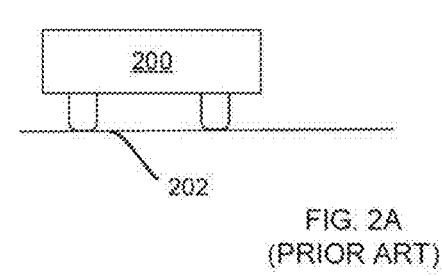
FIGS. 2A-2C are prior art illustrative representations of a rolling device with trailing arm suspension system.
Figure 2B:
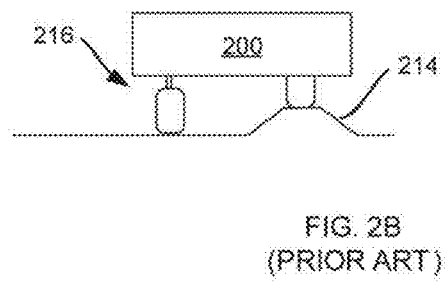
Figure 2C:
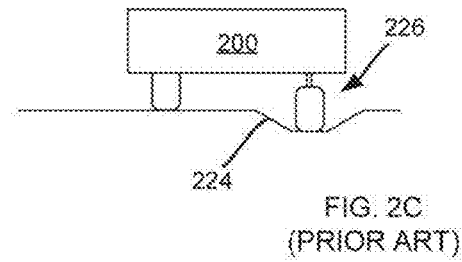

FIGS. 2A-2C are prior art illustrative representations of a rolling device with trailing arm suspension traversing a flat, a localized bump, and a pothole on a rolling surface. In FIG. 2A, rolling device 200 positioned on level surface 202 is illustrated. As rolling device 200 with trailing arm suspension 206 drives on level surface 202, the wheels are pressed against rolling surface 202 and are in a retracted position. In FIG. 2B, rolling device 200 traversing bump 214 is illustrated. As rolling device 200 travels over bump 214 trailing arm suspension 216 of the left wheel is engaged by lowering the left wheel as rolling device 200 is lifted on the right side. This allows both wheels to maintain contact with rolling surface thereby providing control and stability for rolling device 200 while also helping maintain a levelled chassis. In FIG. 2C, rolling device 200 traversing pothole 224 is illustrated. As rolling device 200 encounters pothole 224, right trailing arm suspension 226 is engaged by lowering the right wheel to ensure it maintains contact with rolling surface 202.

Embodiments disclosed herein provide wheeled suspension systems for improving ride quality, control and stability of a robotic device, particularly when driving over different types of surfaces (e.g. hardwood, carpet, tile, etc.), uneven surfaces (e.g. transition from hardwood to carpet, elevated divider in a doorway, etc.) and obstacles (e.g. cords, remote control, etc.). In particular, embodiments include two complementary suspension systems. The first suspension system comprises a trailing arm suspension, where a wheel is coupled to a rotating arm, the rotating arm pivoting about a point on a component fixed to the chassis. To force the wheel to maintain contact with the surface, a force causing the pivoting arm to rotate downwards and be pushed against the surface is applied by an elastic element such as a spring. The forced pivoting action allows each wheel to maintain contact with the driving surface when traversing uneven surfaces or obstacles. In some embodiments, the first suspension system may provide up to approximately 40.0 mm of vertical movement.

FIGS. 3A-C are illustrative representations of a modular wheel embodying features of the first suspension system. In particular, FIG. 4A is an orthogonal perspective of first suspension system 300. FIG. 3B illustrates wheel 304 in a fully retracted position, with suspension system 300 disengaged while FIG. 3C illustrates wheel 304 in a fully extended position. Wheel 304 is mounted to rotating arm 305 and rotating arm 305 is pivotally coupled to frame 302, pivoting about point 307 as shown by lines 312 and 310. Spring 306 is anchored to rotating arm 305 at point 308 on one end and anchored to frame 302 on the opposite end. When wheel 304 is retracted, as in FIG. 3B, spring 306 is extended. Since spring 306 is extended in FIG. 3B, spring 306 pulls on point 308 of rotating arm 305, causing it to pivot about point 307. This causes wheel 304 to be constantly pressed against the driving surface. When an uneven surface is encountered, first suspension system 300 is engaged as in FIG. 3C to ensure the wheel maintains contact with the surface. For example, if a hole is encountered, rotating arm 305 immediately pivots downward due to the force of spring 306, ensuring that wheel 304 maintains contact with the surface. In embodiments, the first suspension system is a long-travel suspension system. The long-travel suspension system may, for example, provide vertical travel of up to approximately 40.0 mm.

In embodiments, a second suspension system embodiment is a short-travel suspension that complements a first suspension system such as described above. A second suspension system contains at least one extension spring positioned vertically to provide linear suspension. In other embodiments, other elastic elements may be used. One end of the extension spring is anchored to the frame of the first suspension system and the other end anchored to a base of the second suspension system, the base slidingly coupled with the frame of the first suspension system. The base and frame may therefore slide relative to one another, the two pulled together by the at least one extension spring. When the wheel is vertically retracted further into the chassis, the extension spring is further extended as the frame of the first suspension system and wheel move further upwards into the chassis. When the wheel is vertically extended beyond the chassis, the extension spring is compressed as the frame of the first suspension system and wheel move further outwards beyond the chassis. In some embodiments, dampers may be positioned along the axis of the spring to dissipate energy and provide stability to the chassis. As contemplated herein, the secondary suspension is complementary to the first suspension system. The secondary suspension system mitigates the effect of the degree of unevenness of the floor surface (i.e., rate of rise and/or rate of fall of the floor surface). In some embodiments, the second suspension system may provide up to approximately 3.0 mm of vertical movement. In some embodiments, the second suspension system may only allow movement in one direction, such as upwards, thereby allowing the wheel to further retract within the chassis. In other embodiments, the second suspension system may allow movement in two directions, allowing the wheel to retract or extend as the robot traverses uneven surfaces. In embodiments where movement in two directions is possible, the spring stiffness is such that the load of the robotic device may be supported without full compression of the spring. Therefore, the suspension may be compressed further, allowing the wheel to extend downward. Embodiments provide improved control over the robotic device by maintaining continual contact between all wheels and the driving surface while also improving the levelness of the chassis. In some embodiments, each wheel may move independently of other wheels and the chassis of the robotic device.

FIG. 4 is an illustrative representation of a modular wheel 400 embodying features of the second suspension system. As illustrated, frame 302 may be slidingly coupled with base 406. In some embodiments, base 406 includes a number of mounting elements for mounting to a robotic device, such as a robotic vacuum device, for example. Mounting elements are well-known in the art and may be utilized in any form factor without limitation. As noted above, a second suspension system embodiment is a short-travel suspension that complements a first suspension system. Second suspension system embodiments are linearly actuated, providing linear action as compared with the pivoting action provided by the first suspension system. As illustrated, second suspension system includes extension springs 412 that are coupled with base 406 by lower anchors 414. Extension springs 412 are also coupled with frame 302 by upper anchors 416. Further, extension springs 412 are secured within spring housings 418. As noted above, extension springs 412 are intended to be stiff enough to slightly overcome the weight of the robotic device, particularly when movement in two directions is allowed. As such, any extension spring tension may be selected to function properly for a given weight of a robotic device without departing from embodiments provided herein. Extension spring embodiments may include other elastic elements without limitation.

Further illustrated are dampers 420, which may be positioned along the axis of extension springs 412. Dampers are an effective compliment to springs, as springs can easily collect and eject energy when the robotic device hits a bump or dip. Dampers may be useful to disperse this energy. For example, after a robotic device clears an obstacle, there may be residual oscillating energy in the suspension springs that may cause the robotic device to oscillate and vibrate. Dampers may serve to disperse this energy, keeping the robotic device stable. However, embodiments herein do not require dampers.

Still further illustrated are travel limiting screws 422 that may be disposed on base 406. Travel limiting screws 422 fit are coupled with frame 302 and fit within holes 432. Travel limiting screws 422 limit the travel of frame 302 as frame 302 moves relative to base 406. The tension of extension springs 412 may be chosen such that the position of frame 302 along the length of the shaft of travel limiting screws 422 may provide a desired range of upward and downward vertical movement. When placed on the driving surface, a force substantially equal and opposite to the weight of the robotic device acts on the wheels (304), thereby pushing frame 302 vertically upwards relative to base 406. Since frame 302 and base 406 are mechanically coupled by extension springs 412, the tension of extension springs 412 determine the amount by which frame 302 is pushed upwards. For example, when frame 302 is positioned above travel limiting screws 422, the secondary suspension system is configured to provide upwards and downwards vertical movement. In some embodiments, movement in one direction is provided while in other embodiments movement in two directions is provided. In some embodiments, the retracted distance (maximum upward movement) is equal to the extended distance (maximum downward movement). In other embodiments, the retracted distance is greater than the extended distance and vice versa. In some embodiments, the retracted distance and the extended distance are approximately 3.0 mm. In other embodiments, other retracted distances and extended distances are possible.

Figure 5A:
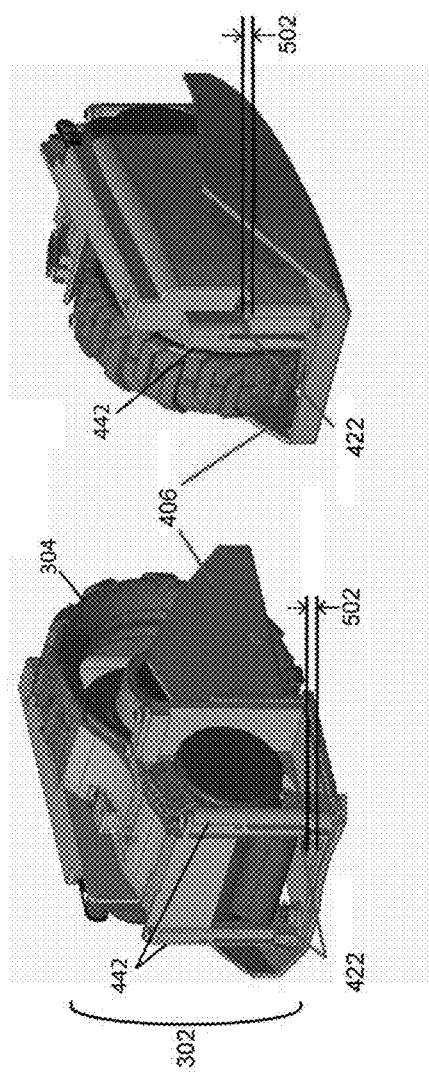
FIGS. 5A and 5B are illustrative representations of a wheel embodying features of the present invention.
Figure 5B:
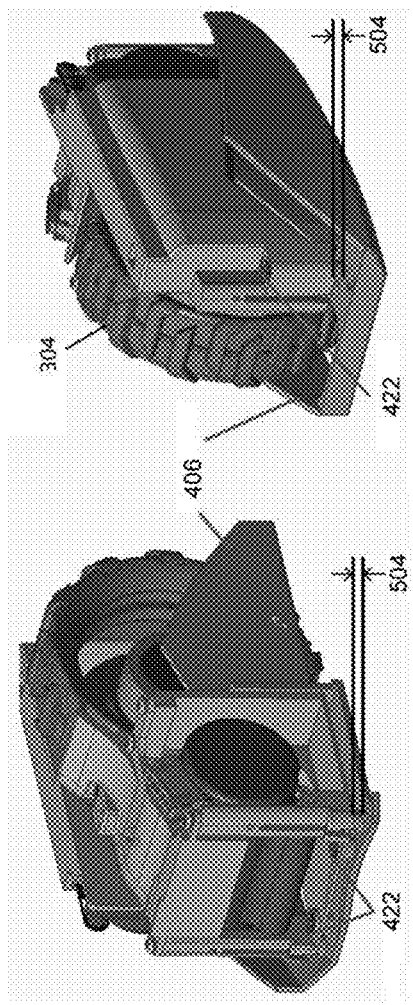

For example, FIGS. 5A and 5B demonstrate an embodiment of the second suspension system wherein only upward vertical movement of frame 302 relative to base 406 is allowed. The chosen stiffness of springs 412 are such that the force acting on the wheels cannot cause extension of springs 412 and hence position frame 302 at a distance upwards along the shaft of travel limiting screws 422. As such, frame 302 is positioned at the base of the shaft of travel limiting screws 422, allowing only upward movement of frame 302 and wheel 304. In the illustrated embodiment, the second suspension system has three points of suspension 442 wherein three extension springs and corresponding structures are utilized, making it a three-point suspension system. In other embodiments, the second suspension system may contain any other number of springs, for example, two extension springs make the system a two-point suspension system. The three-point suspension system of FIG. 5A illustrates the position of frame 302 and attached wheel 304 when the suspension system is not engaged while FIG. 5B illustrates the position of frame 302 and attached wheel 304 when the suspension system is engaged and at maximum retraction. In FIG. 5A the total possible upward movement of frame 302 and attached wheel 304 is shown by distance 502, limited by travel limiting screws 422. FIG. 5B shows the total vertical distance 504 by which frame 302 and wheel 304 travelled to reach maximum retraction. The illustrated representations are presented in color to more clearly illustrate the component parts of the invention as disclosed herein. In some embodiments, however, travel limiting screws may not be required.

Figure 6A:
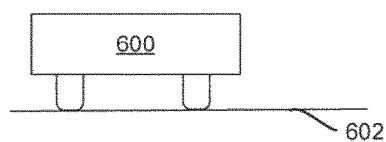
FIGS. 6A-6E are illustrative representations of a robotic device with linear and trailing arm suspension systems embodying features of the present invention.
Figure 6B:
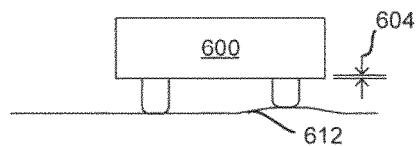
Figure 6C:
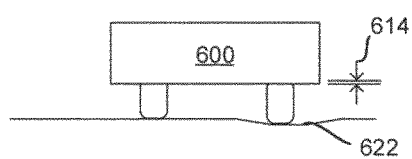

FIGS. 6A-6E are illustrative representations of a robotic device embodying features of the present invention. Employment of two complementary suspension systems are illustrated. In this example, the second suspension system allows linear travel in two directions. In FIG. 6A, robotic device 600 is positioned on level surface 602 and all wheels have full contact with flat surface 602. In FIG. 6B robotic device 600 encounters slight bump 612. As robotic device 600 traverses minor bump 612 the second suspension system is engaged slightly raising the right wheel by distance 604 such that robotic device 600 may maintain a level attitude. In FIG. 6C, robotic device 600 encounters minor pothole 622. As robotic device 600 traverses minor pothole 622 the second suspension system is engaged slightly lowering the right wheel by distance 614 such that robotic device 600 may maintain a levelled attitude. In this manner, the second suspension engages before the first suspension and thus provides a wider range of suspension for robotic devices.

Figure 6D:
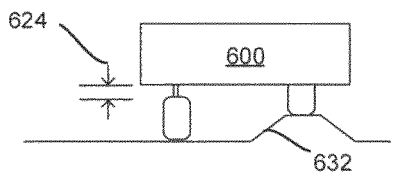
Figure 6E:
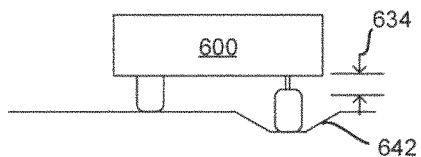

In FIG. 6D, robotic device 600 encounters large bump 632. As robotic device 600 traverses bump 632 the first and second suspension systems are engaged, lowering the left wheel by a total distance 624 such that the wheels of robotic device 600 maintain contact with the driving surface and the chassis remains at a levelled attitude. In FIG. 6E, robotic device 600 encounters pothole 642. As robotic device 600 traverses pothole 642 the first and second suspension systems are engaged to lower the right wheel by a total distance 634 such that the wheels of robotic device 600 maintain contact with the driving surface and the chassis remains at a levelled attitude. In this manner, the second suspension engages along with first suspension and thus provides a wider range of suspension for robotic devices.

An approximate range considered for the second suspension system is small when compared to the range of the first suspension system. For example, in some embodiments, the ratio of travel between the first and second suspension systems may be at least approximately 10:1. In some embodiments, the vertical movement of the first suspension is approximately 40.0 mm, for example, and the vertical movement of the second suspension is approximately 3.0 mm, for example. In particular, for the second suspension system, the wheels may move 1.5 mm up and 1.5 mm down, for a total range of approximately 3.0 mm. If the robotic device encounters a bump or dip smaller than 1.5 mm, the bump or dip may go completely unnoticed by the rest of the robotic device. In the case of a bump or dip larger than 1.5 mm, the robotic device will not remain at the same height throughout. However, the second suspension system acts as a first line of defense and may make this transition effectively smaller and more gradual. In other embodiments, other ratio of travel between the first and second suspension systems are possible and other vertical movement measurements may be achieved.

In addition to the aforementioned springs, a set of dampers may be incorporated into wheel assembly embodiments. Dampers may be an effective compliment to springs, as springs can easily collect and eject energy when the robotic device hits a bump or dip. Dampers may be useful to disperse this energy. For example, after a robotic device clears an obstacle, there may be residual oscillating energy in the suspension springs that may cause the robotic device to oscillate and vibrate. Dampers may serve to disperse this energy, keeping all motion of the robotic device stable. In some embodiments, however, dampers are not required.

Figure 7A:
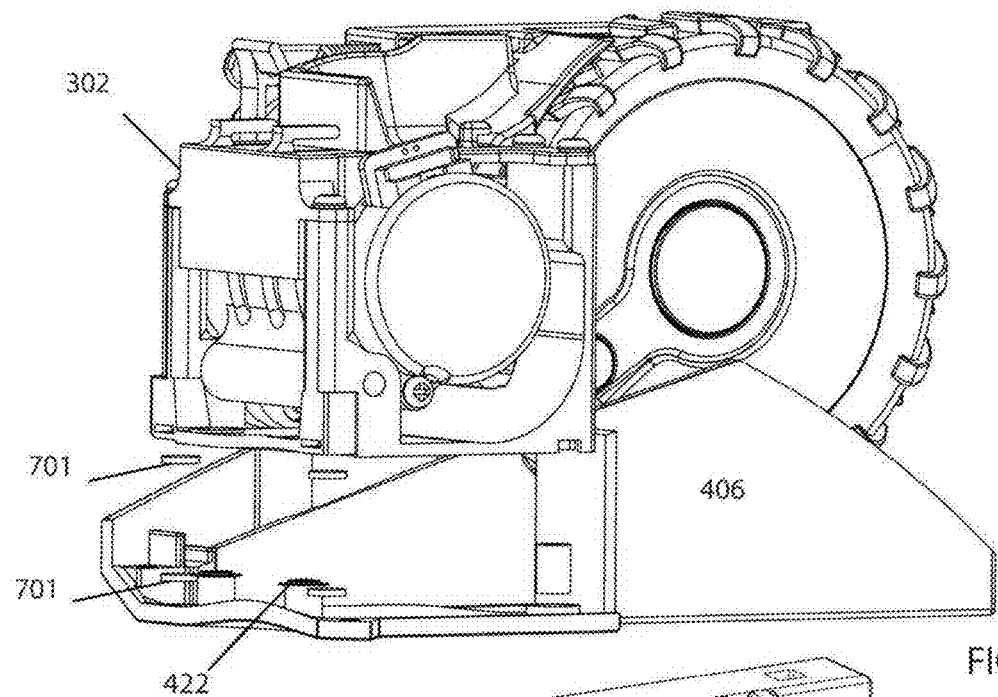
FIGS. 7A and 7B are illustrative representations of a wheel embodying features of the present invention.
Figure 7B:
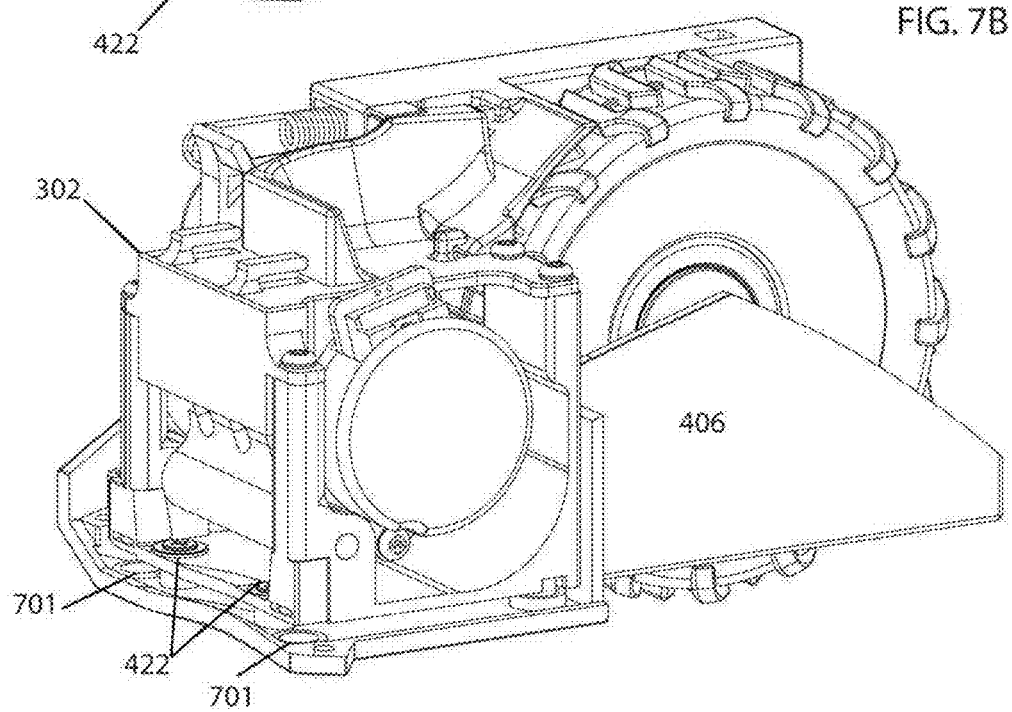
Figure 8:
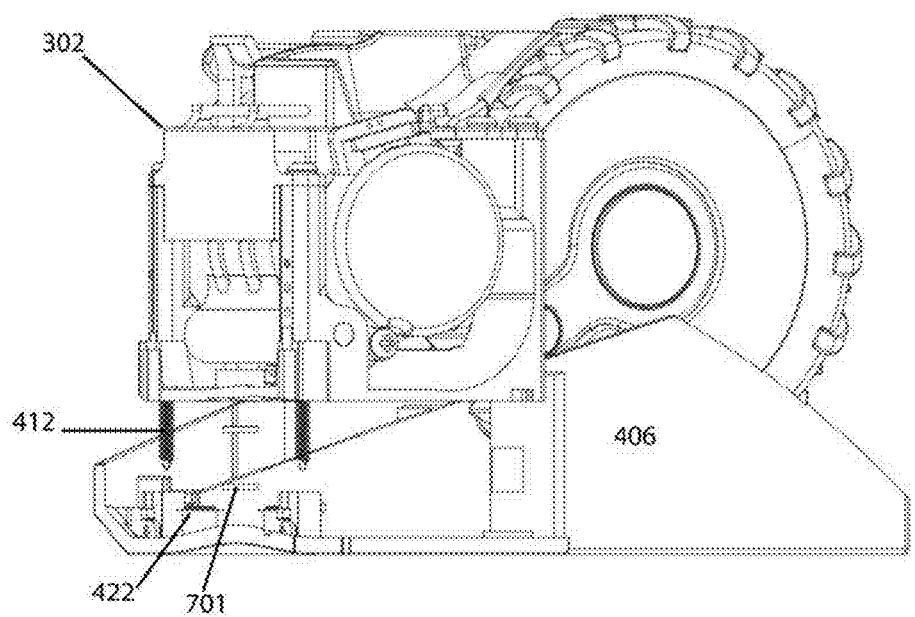
FIG. 8 is an illustrative representation of a wheel embodying features of the present invention.

In some embodiments, magnets may be used in exchange for extension springs in the second suspension system. In FIG. 7A an exploded view is shown with inclusion of magnets 701. FIG. 7B illustrates the second suspension system comprising base 406, slidingly coupled with frame 302, the two attracted to each other by paired magnets 701. Paired magnets are oriented by opposite poles such that they attract one another. As illustrated, one of the paired magnets 701 is affixed to frame 302 while the other paired magnet is affixed to base 406. Traveling limiting screws 422 limit the linear separation of frame 302 and base 406 as they slide relative to one another. Upon encountering uneven surfaces, such as small bumps or holes, the magnets will separate and pull back together as required, allowing a smoother ride. One or more sets of magnets may be used between frame 302 and base 406. For instance, two magnet pairs may be positioned in the rear with one in the front and one on the side. Other variations may also be possible. In one embodiment, each wheel will utilize three magnet pairs. In yet another embodiment, magnets may be used in addition to extension springs in the second suspension system, both having complimentary functionality as when used independently. FIG. 8A illustrates an exploded view of the second suspension system comprising extension springs 412 and magnetic pair 701. Extension springs 412 extend and compress and magnets come together and pull apart as the robotic device drives over uneven surfaces, providing a smoother riding experience. As above, traveling limiting screws 422 limit the linear separation of frame 302 and base 406 as they slide relative to one another.

As noted above, wheel embodiments may be utilized in combination with a robotic device such as a robotic vacuum. In use, three or more wheel embodiments may be incorporated with a robotic device, where the robotic device includes a body and an electronic computing device housed within the body. Wheel embodiments may be removably coupled with a robotic device. Wheel embodiments provide improved handling characteristics for robotic devices.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A robotic device comprising:
   a body;
   an electronic computing device housed within the body; and
   at least two wheeled suspension systems coupled with the body, each wheeled suspension system comprising,
      a first suspension system comprising:
         a frame,
         a rotating arm pivotally coupled to the frame on a first end and coupled to a wheel on a second end, and
         an extension spring coupled with the rotating arm on a third end and the frame on a fourth end, wherein the extension spring is extended when the wheel is retracted,
      a second suspension system comprising:
         a base slidingly coupled with the frame,
         a plurality of vertically positioned extension springs coupled with the frame on a fifth end and the base on a sixth end, and
         a plurality of dampers positioned along each axis of each of the plurality of extension springs.

2. The robotic device of claim 1, wherein the extension spring of the first suspension system applies a force to the rotating arm as the extension spring compresses, causing the rotating arm to rotate outwards beyond the base towards the driving surface.

3. The robotic device of claim 2, wherein the rotating arm rotates outwards beyond the base towards the driving surface until the wheel coupled to the rotating arm contacts the driving surface.

4. The robotic device of claim 3, wherein the wheel coupled to the rotating arm presses against the driving surface when the rotating arm is forcibly rotated outwards beyond the base towards the driving surface.

5. The robotic device of claim 1, wherein the plurality of extension springs of the second suspension system apply a force to the frame and base, pulling the two components together as the extension springs compress.

6. The robotic device of claim 5, wherein extension of the plurality of extension springs of the second suspension system cause vertical upward movement of the frame, rotating arm, and wheel.

7. The robotic device of claim 6, wherein compression of the plurality of extension springs of the second suspension system cause vertical downward movement of the frame, rotating arm, and wheel.

8. The robotic device of claim 1, wherein the frame comprises a plurality of spring housings for retaining the plurality of extension springs of the second suspension system.

9. The robotic device of claim 1, wherein the base further comprises a plurality of travel limiting screws that limit linear displacement of the second suspension system by physically limiting the movement of the frame by contact with the screw.

10. The robotic device of claim 1, wherein the second suspension system comprises a three-point suspension system.

11. The robotic device of claim 1, wherein the secondary suspension system includes at least one set of paired magnets, with at least one magnet affixed to the frame and paired to at least one magnet affixed to the base.

12. The robotic device of claim 11, wherein the at least one set of paired magnets enable the frame and base to separate when traversing uneven surfaces and pull the frame and base together after separation.

13. The robotic device of claim 1, further comprising a plurality of mounting elements that couple the double suspension wheel system to a robotic device.

14. The robotic device of claim 1, wherein the first suspension system is a long-travel suspension system.

15. The robotic device of claim 1, wherein the first suspension system is pivotally actuated.

16. The robotic device of claim 1, wherein the second suspension system is a short-travel suspension system.

17. The robotic device of claim 1, wherein the second suspension system is linearly actuated.

18. A wheeled suspension system comprising:
    a first suspension system comprising:
       a frame,
       a rotating arm pivotally coupled to the frame on a first end and coupled to a wheel on a second end, and
       an extension spring coupled with the rotating arm on a third end and the frame on a fourth end, wherein the extension spring is extended when the wheel is retracted,
    a second suspension system comprising:
       a base slidingly coupled with the frame,
       a plurality of vertically positioned extension springs coupled with the frame on a fifth end and the base on a sixth end, and
       a plurality of dampers positioned along each axis of each of the plurality of extension springs.

19. The wheeled suspension system of claim 18, wherein the frame comprises a plurality of spring housings for retaining the plurality of extension springs of the second suspension system.

20. The wheeled suspension system of claim 18, wherein the base further comprises a plurality of travel limiting screws that limit linear displacement of the second suspension system by physically limiting the movement of the frame by contact with the travel limit screw.

21. The wheeled suspension system of claim 18, wherein the second suspension system comprises a three-point suspension system.

22. The wheeled suspension system of claim 18, wherein the secondary suspension system includes at least one set of paired magnets, with at least one magnet affixed with the frame and paired to at least one magnet affixed with the base.

23. The wheeled suspension system of claim 18, further comprising a plurality of mounting elements that couple the double suspension wheel system to a robotic device.

24. The wheeled suspension system of claim 18, wherein the first suspension system is a long-travel suspension system.

25. The wheeled suspension system of claim 18, wherein the first suspension system is pivotally actuated.

26. The wheeled suspension system of claim 18, wherein the second suspension system is a short-travel suspension system.

27. The wheeled suspension system of claim 18, wherein the second suspension system is linearly actuated.

28. The wheeled suspension system of claim 18, wherein the extension spring and rotating arm are horizontally oriented.

* * * * *